(12) United States Patent
Tan et al.

(10) Patent No.: US 11,743,400 B2
(45) Date of Patent: Aug. 29, 2023

(54) ELECTRONIC APPARATUS THAT CAUSES DISPLAY DEVICE TO DISPLAY INFORMATION CORRESPONDING TO KEYWORD AND INTERROGATIVE IN INPUTTED CHARACTER STRING FOR QUESTIONING A LOCATION, AND IMAGE FORMING APPARATUS

(71) Applicant: KYOCERA Document Solutions Inc., Osaka (JP)

(72) Inventors: Eugine Tan, Osaka (JP); Jaclyn Tiffanie Tan, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/880,637

(22) Filed: Aug. 3, 2022

(65) Prior Publication Data
US 2023/0048246 A1    Feb. 16, 2023

(30) Foreign Application Priority Data

Aug. 10, 2021    (JP) .................................. 2021-130669

(51) Int. Cl.
*H04N 1/00*       (2006.01)
*G06F 16/903*    (2019.01)

(52) U.S. Cl.
CPC ... *H04N 1/00395* (2013.01); *G06F 16/90344* (2019.01); *H04N 1/0097* (2013.01); *H04N 1/00411* (2013.01); *H04N 1/00482* (2013.01); *H04N 1/00122* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2017/0371537 | A1* | 12/2017 | Sato | G06F 3/1253 |
| 2019/0068834 | A1* | 2/2019 | Ichikawa | H04N 1/00395 |
| 2019/0286665 | A1* | 9/2019 | Matsui | G06F 9/453 |
| 2019/0349489 | A1 | 11/2019 | Inagaki | |
| 2020/0213459 | A1* | 7/2020 | Miyai | H04N 1/0097 |
| 2021/0055843 | A1* | 2/2021 | Dandoko | G06F 3/04842 |
| 2021/0342785 | A1* | 11/2021 | Mann | G06Q 10/063118 |

FOREIGN PATENT DOCUMENTS

JP        2019198987 A      11/2019

* cited by examiner

*Primary Examiner* — Haris Sabah
(74) *Attorney, Agent, or Firm* — IP BUSINESS SOLUTIONS, LLC (57) ABSTRACT

An electronic apparatus includes a display device, an operation device, and a control device. The control device acts as a controller. The controller causes the display device, when a character string inputted via the operation device contains a keyword and a first interrogative for questioning a method, to display procedure information indicating a procedure related to the setting item corresponding to the keyword. The controller causes the display device, when the character string contains the keyword and a second interrogative for questioning a location, to display location information indicating a location of a setup screen related to the setting item corresponding to the keyword. The controller causes the display device, when the character string contains the keyword and a third interrogative for questioning what a subject is, to display a current set value of the setting item corresponding to the keyword.

4 Claims, 9 Drawing Sheets

ELECTRONIC APPARATUS THAT CAUSES DISPLAY DEVICE TO DISPLAY INFORMATION CORRESPONDING TO KEYWORD AND INTERROGATIVE IN INPUTTED CHARACTER STRING FOR QUESTIONING A LOCATION, AND IMAGE FORMING APPARATUS

INCORPORATION BY REFERENCE

This application claims priority to Japanese Patent Application No. 2021-130669 filed on Aug. 10, 2021, the entire contents of which are incorporated by reference herein.

BACKGROUND

The present disclosure relates to an electronic apparatus and an image forming apparatus, and in particular to a technique to display information regarding an setting item to be specified.

Some techniques to display information about an setting item are known. For example, one of such techniques includes searching the setting item of operating conditions of a job associated with an inputted keyword, and changing a display related to the setting item that has been searched, on a setup screen displayed on a display device, to a display corresponding to the inputted keyword.

SUMMARY

The disclosure proposes further improvement of the foregoing techniques.

In an aspect, the disclosure provides an electronic apparatus including a display device, an operation device, and a control device. The operation device receives a character string inputted by a user. The control device includes a processor, and acts as a controller when the processor executes a control program. The controller executes a predetermined process according to a set value of a predetermined setting item. The controller causes the display device, when the character string inputted via the operation device contains a predetermined keyword corresponding to the setting item, and a predetermined first interrogative for questioning a method, to display procedure information indicating a procedure for changing or specifying the set value of the setting item corresponding to the keyword. The controller causes the display device, when the character string contains the keyword and a predetermined second interrogative for questioning a location, to display location information indicating a location of a setup screen for specifying the set value of the setting item corresponding to the keyword. The controller causes the display device, when the character string contains the keyword and a predetermined third interrogative for questioning what a subject is, to display a current set value of the setting item corresponding to the keyword.

DETAILED DESCRIPTION

Figure 1:
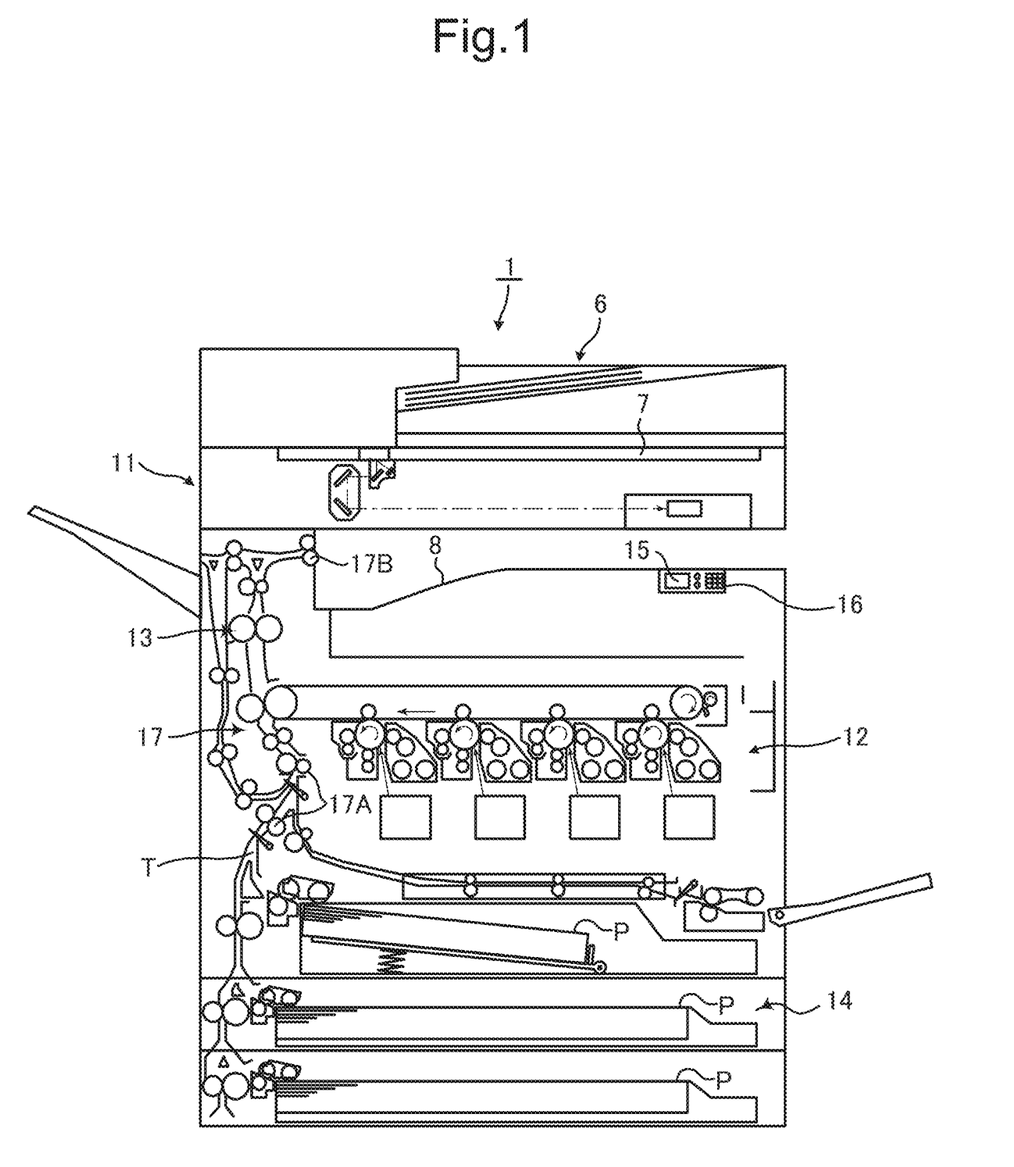
FIG. 1 is a front cross-sectional view showing a structure of an image forming apparatus.
Figure 2:
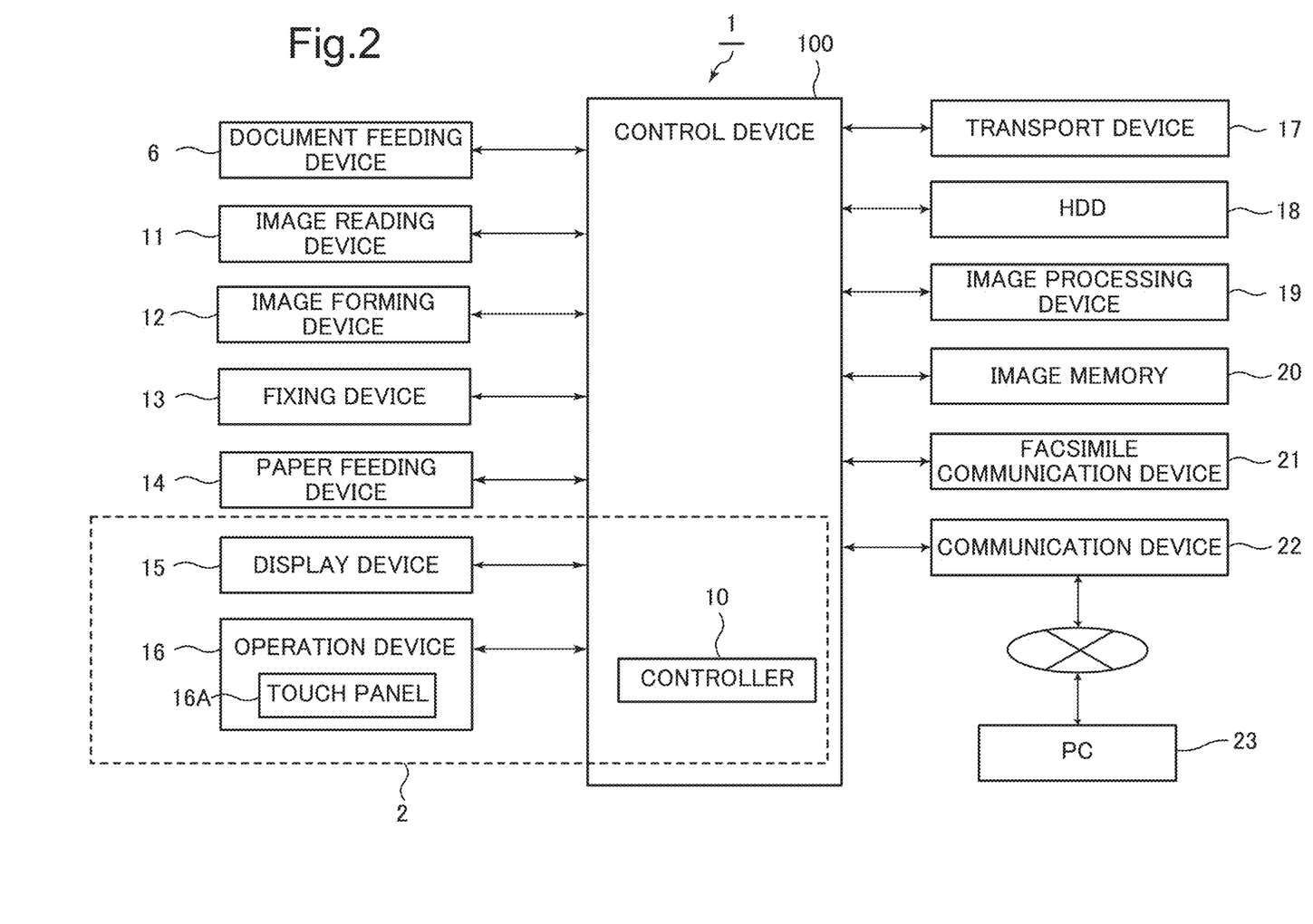
FIG. 2 is a block diagram showing an internal configuration of the image forming apparatus.

Hereafter, an image forming apparatus including an electronic apparatus according to an embodiment of the disclosure will be described, with reference to the drawings. FIG. 1 is a front cross-sectional view showing a structure of the image forming apparatus. FIG. 2 is a block diagram showing an internal configuration of the image forming apparatus.

Referring to FIG. 1, the image forming apparatus 1 is a multifunction peripheral having a plurality of functions, such as copying, transmitting, printing, and facsimile transmission. In the casing of the image forming apparatus 1, a plurality of components for realizing various functions of the image forming apparatus 1 are provided. For example, an image reading device 11, an image forming device 12, a fixing device 13, a paper feeding device 14, and a transport device 17 are provided inside the casing. On the front face of the casing, a display device 15 and an operation device 16 are provided.

The image reading device 11 is configured as an automatic document feeder (ADF) including a document feeding device 6 that delivers a source document placed on a document table, and a scanner that optically reads the source document, delivered from the document feeding device 6 or placed on a platen glass 7. The image reading device 11 reads the image of the source document, by emitting light from a light emitting device to the source document and receiving the reflected light with a charge-coupled device (CCD) sensor, and generates image data.

The image forming device 12 includes a photoconductor drum, a charging device, an exposure device, a development device, and a transfer device. The image forming device 12 forms, under the control of a controller 10, an image constituted of a toner image on a recording sheet P, transported by the transport device 17 along a transport route T, on the basis of the image data generated by the document reading device 11, or image data inputted through the communication device 22, and according to a set value of an setting item related to the image forming.

The fixing device 13 heats and presses the recording sheet P on which the toner image has been formed by the image forming device 12, to thereby fix the toner image onto the recording sheet. The recording sheet P on which the toner image has been fixed by the fixing device 13 is delivered to an output tray 8.

The paper feeding device 14 includes a manual bypass tray, and a plurality of paper cassettes. The paper feeding device 14 draws out the recording sheets P stored in one of the plurality of paper cassettes, or the recording sheets placed on the manual bypass tray, one by one with a pickup roller, and delivers the recording sheet to the transport route T.

The display device 15 is, for example, constituted of an LCD or an organic light-emitting diode (OLED) display. The display device 15 displays, under the control of the controller 10, various types of screen related to the functions that the image forming apparatus 1 is configured to perform, in the display region.

The operation device 16 includes a plurality of hard keys, such as a start key for instructing the start of a desired function. The operation device 16 also includes a touch panel 16A overlaid on the display device 15. The user can input, through the operation device 16, various types of information, including instructions related to the functions that the image forming apparatus 1 is configured to perform.

The transport device 17 includes a transport roller pair 17A, a delivery roller pair 17B, and a transport motor connected to the transport roller pair 17A and the delivery roller pair 17B. The controller 10 drives the transport motor so as to rotate the transport roller pair 17A and the delivery roller pair 17B, thereby transporting the recording sheet P delivered from the paper feeding device 14 along the transport route T, toward the image forming device 12 and then to the output tray 8.

Referring to FIG. 2, the image forming apparatus 1 includes a control device 100. The control device 100 includes a processor, a random-access memory (RAM), a read-only memory (ROM), and so forth. The processor is, for example, a central processing unit (CPU), a micro processing unit (MPU), or an application specific integrated circuit (ASIC).

The control device 100 acts as the controller 10, when the processor operates executes a control program stored in the ROM or an HDD 18. The controller 10 serves to control the overall operation of the image forming apparatus 1. To be more detailed, the controller 10 controls the operation of each of the components of the image forming apparatus 1, and communication with a personal computer (PC) 23 connected via a network. Here, the controller 10 may be constituted of a logic circuit, instead of being realized by the operation according to the control program.

The control device 100 is electrically connected to the document feeding device 6, the image reading device 11, the image forming device 12, the fixing device 13, the paper feeding device 14, the display device 15, the operation device 16, the transport device 17, the HDD 18, an image processing device 19, an image memory 20, a facsimile communication device 21, and a communication device 22. The display device 15, the operation device 16, and the controller 10 constitute the electronic apparatus 2.

The HDD 18 is a large-capacity storage device for storing various types of data, such as the image data generated by the image reading device 11. In the HDD 18, the respective names of a plurality of setting items, related to the functions that the image forming apparatus 1 is configured to perform, are stored. In the HDD 18, in addition, a predetermined keyword, procedure information indicating a procedure for specifying a set value, location information indicating a location of a setup screen for specifying the set value (e.g., link information of the setup screen), and the current set value are stored in association with each other, with respect to each of the plurality of setting items.

In this embodiment, the keyword "IP address" is stored in the HDD 18, with respect to the setting item "IP address". The HDD 18 further contains various control programs for realizing basic operations of the image forming apparatus 1. For example, the HDD 18 contains, as one of the control programs, a search program for performing a search operation according to the embodiment of the disclosure.

By operating according to the search program, the controller 10 performs the search operation including causing the display device 15, when a character string inputted via the operation device 16 includes the keyword corresponding to the setting item, and a predetermined first interrogative for questioning a method, to display the procedure information indicating the procedure related to the setting item corresponding to the keyword, causing the display device 15, when the character string contains the keyword and a predetermined second interrogative for questioning a location, to display the location information indicating the location of the setup screen for specifying the set value of the setting item corresponding to the keyword, and causing the display device 15, when the character string contains the keyword and a predetermined third interrogative for questioning what is the subject in the character string, to display the current set value of the setting item corresponding to the keyword.

The first interrogative is, for example, an interrogative such as "how". The second interrogative is, for example, an interrogative such as "where". The third interrogative is, for example, an interrogative such as "what". In this embodiment, the controller 10 has determined in advance the first interrogative as "how", the second interrogative as "where", and the third interrogative as "what".

The image processing device 19 executes, as necessary, the image processing to the image data generated by the image reading device 11. The image memory 20 includes a region for temporarily storing the image data generated by the image reading device 11. The facsimile communication device 21 makes connection to the public telephone line, and transmits and receives the image data via the public telephone line.

The communication device 22 includes a communication module such as a local area network (LAN) board. The controller 10 performs data communication through the communication device 22, for example with the PC 23 connected via a network, according to a value of an IP address currently specified with respect to the setting item "IP address".

A power source is provided for each of the components of the image forming apparatus 1, so that those components are activated with the power supplied from the power source.

[Operation]

Figure 3A:
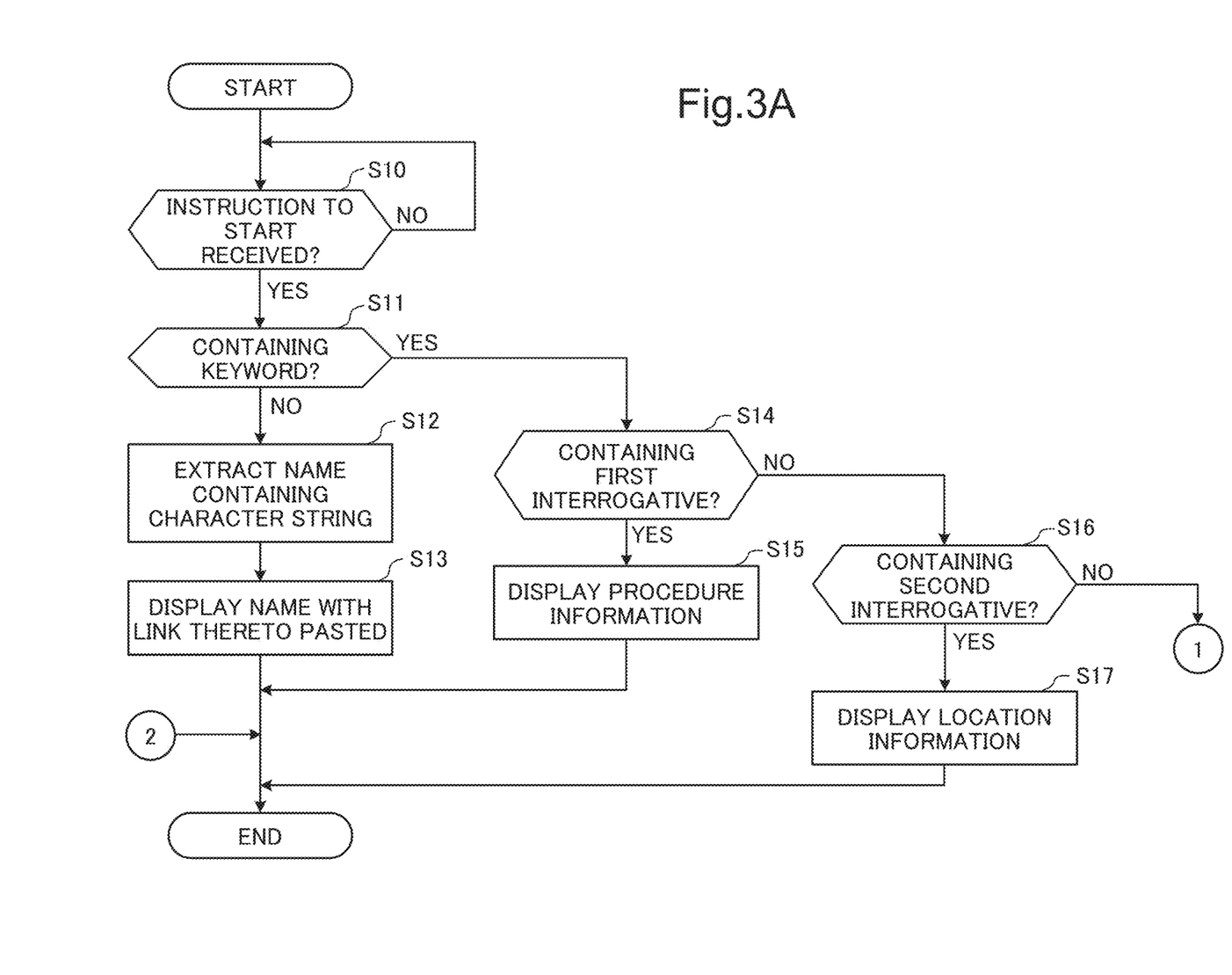
FIG. 3A is a flowchart showing a search operation.
Figure 3B:
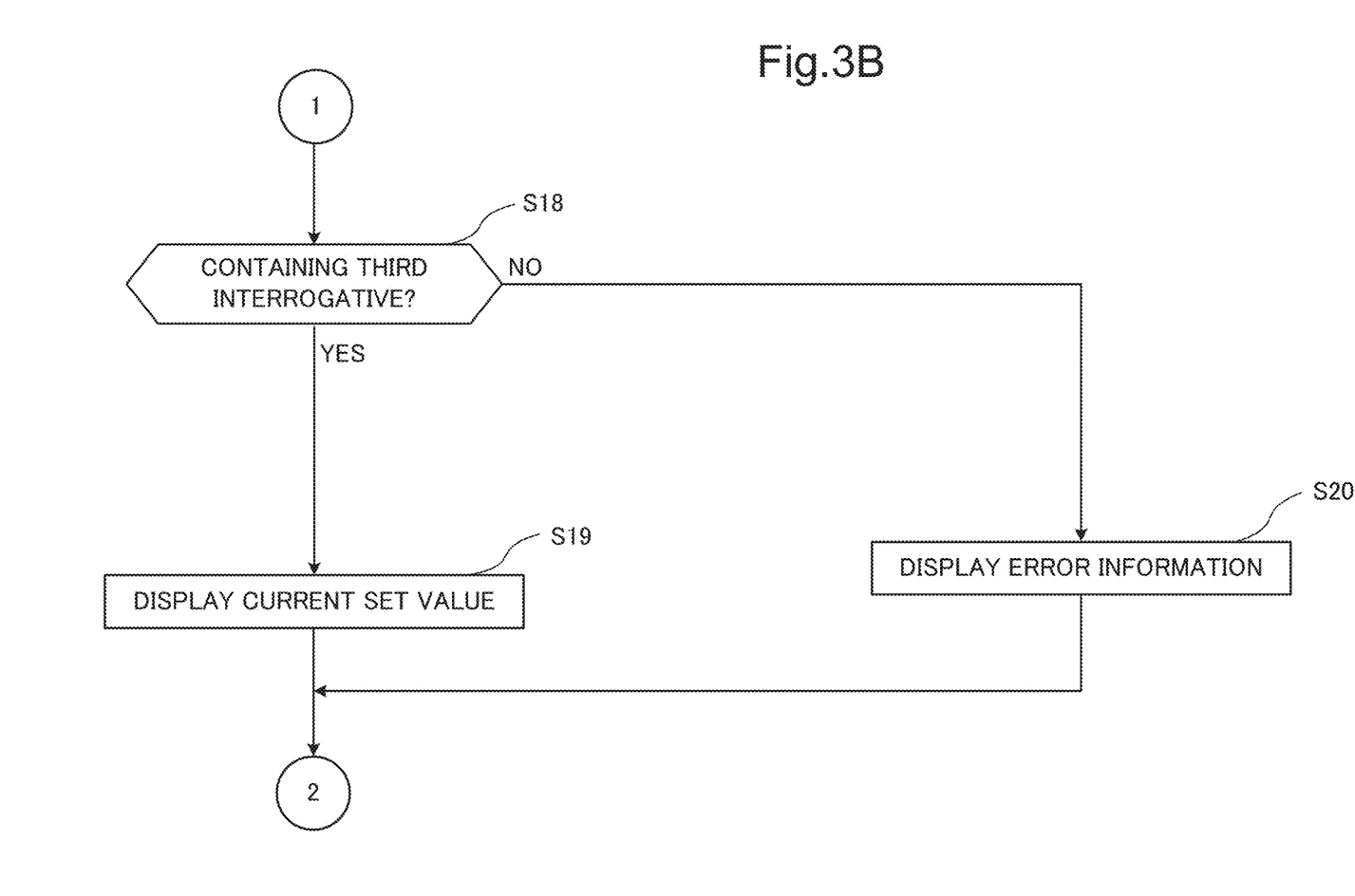
FIG. 3B is another flowchart showing the search operation.
Figure 4:
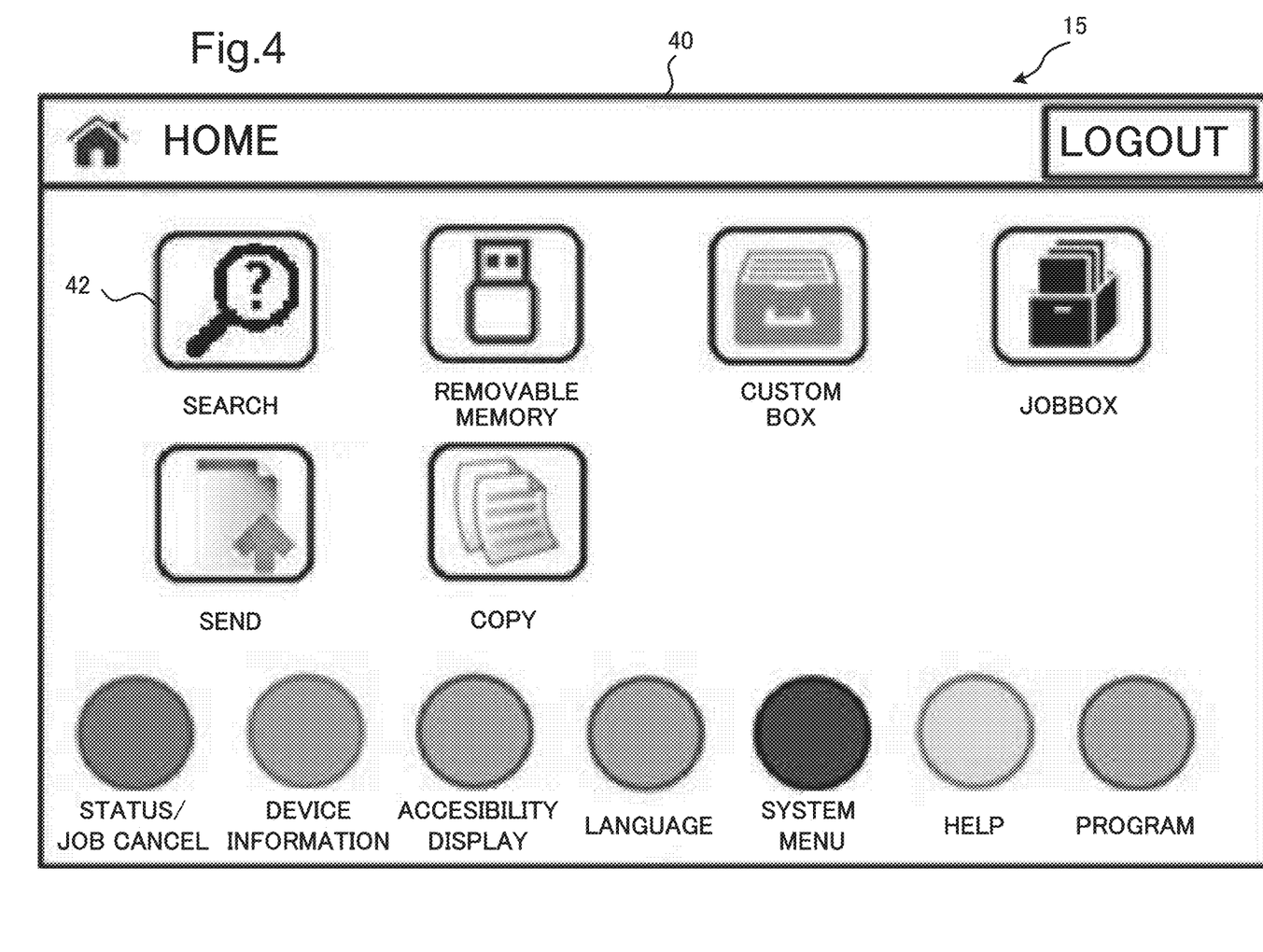
FIG. 4 is a schematic drawing showing an example of a home screen.
Figure 5:
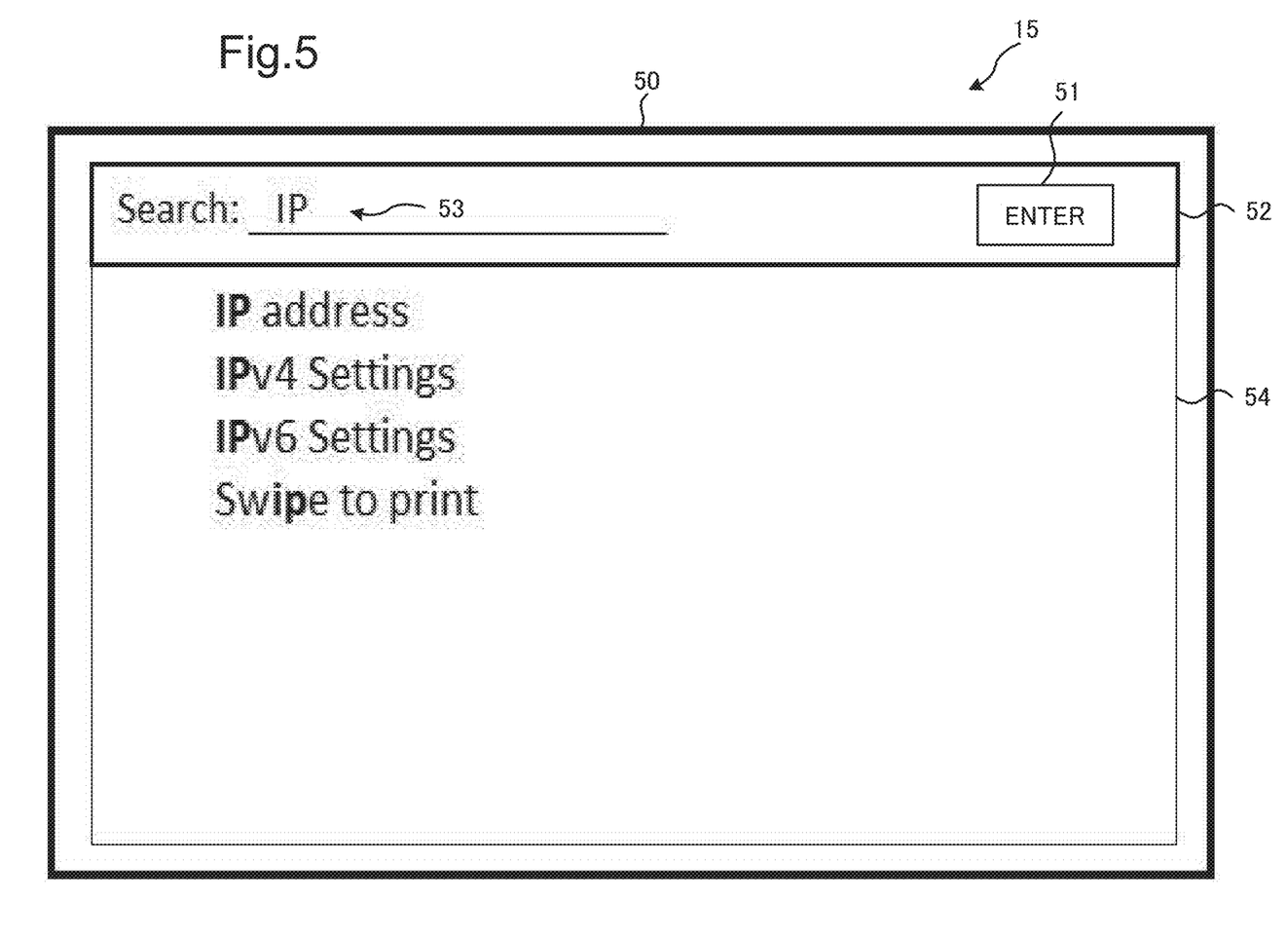
FIG. 5 is a schematic drawing showing an example of a search screen.
Figure 6:
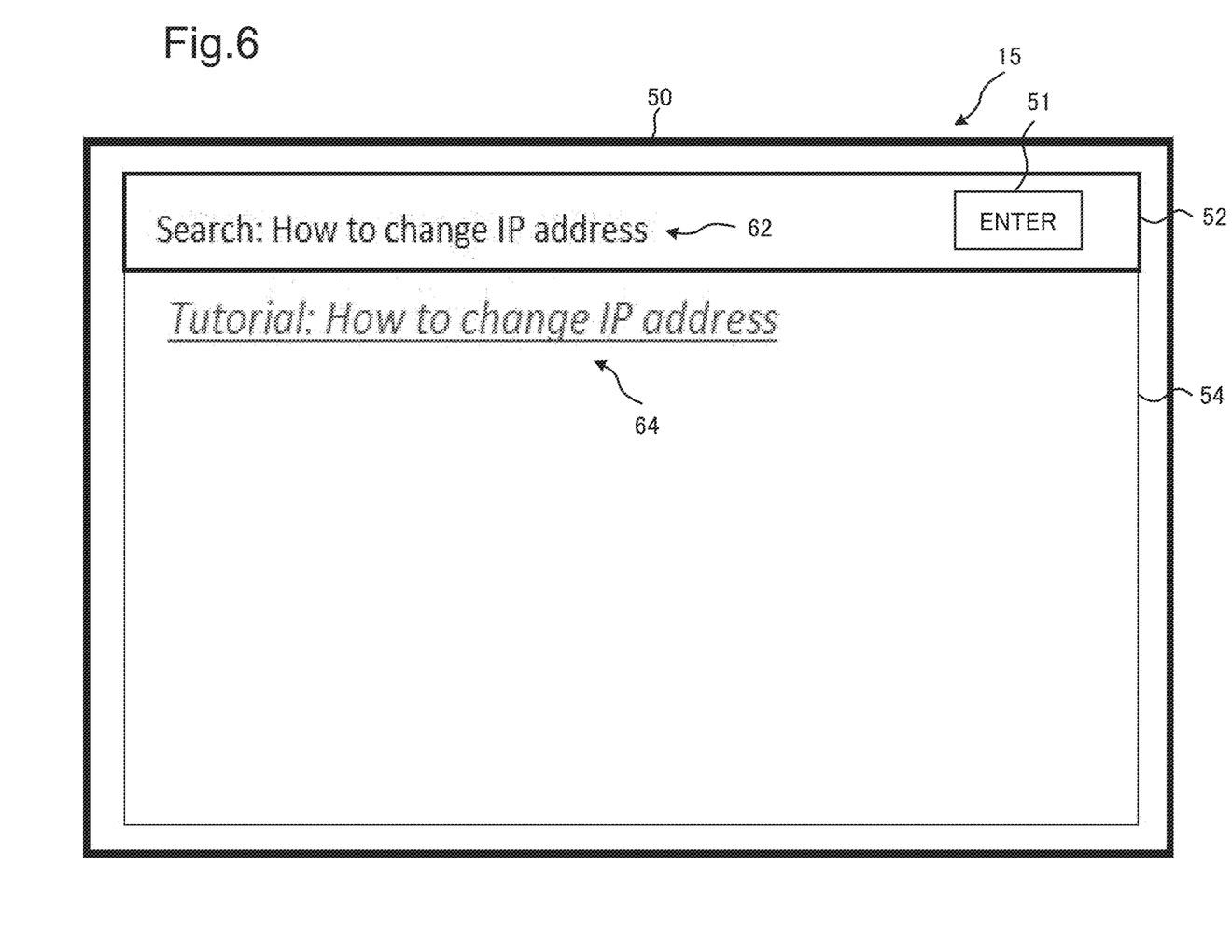
FIG. 6 is a schematic drawing showing the search screen in which a first interrogative has been inputted.
Figure 7:
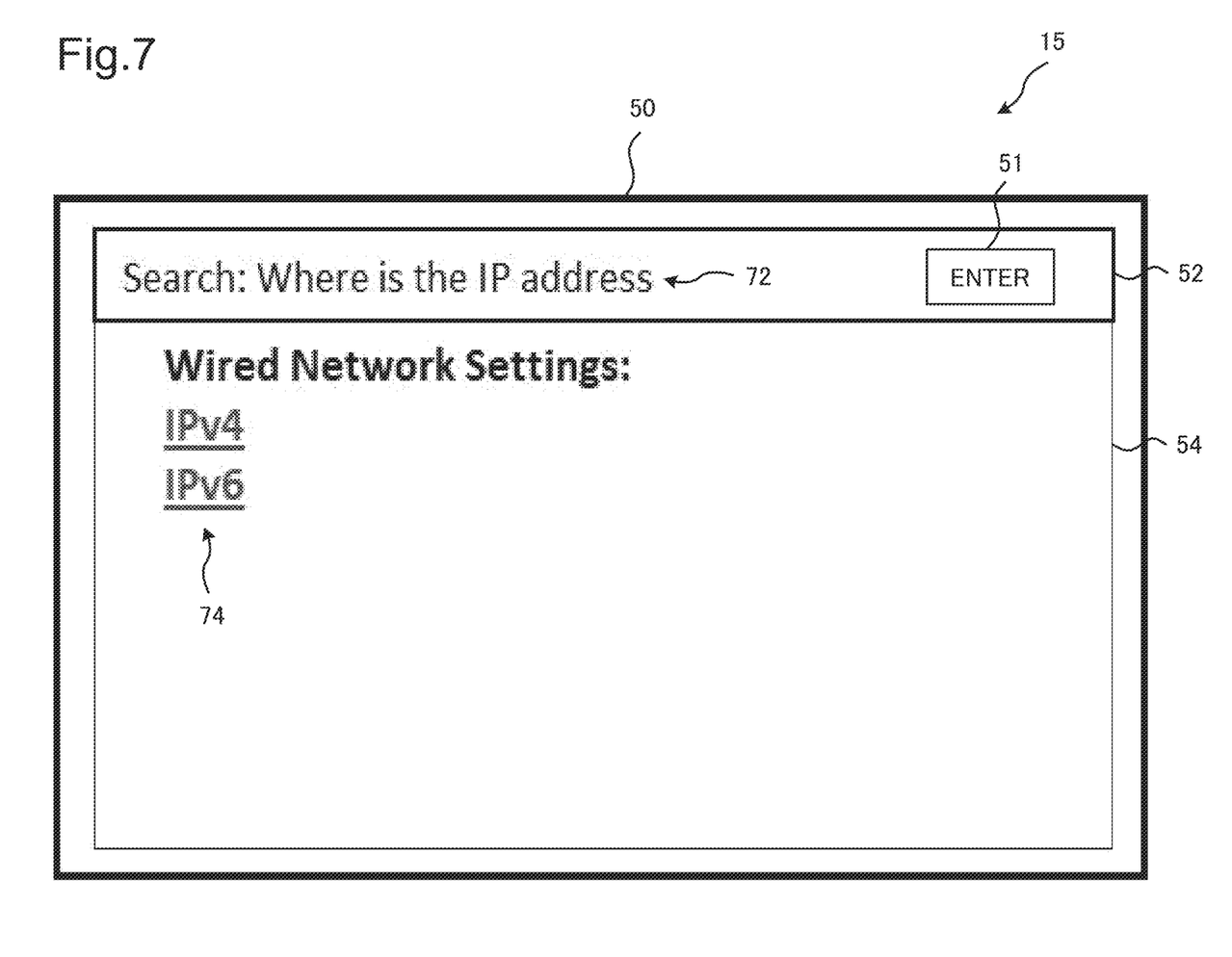
FIG. 7 is a schematic drawing showing the search screen in which a second interrogative has been inputted.
Figure 8:
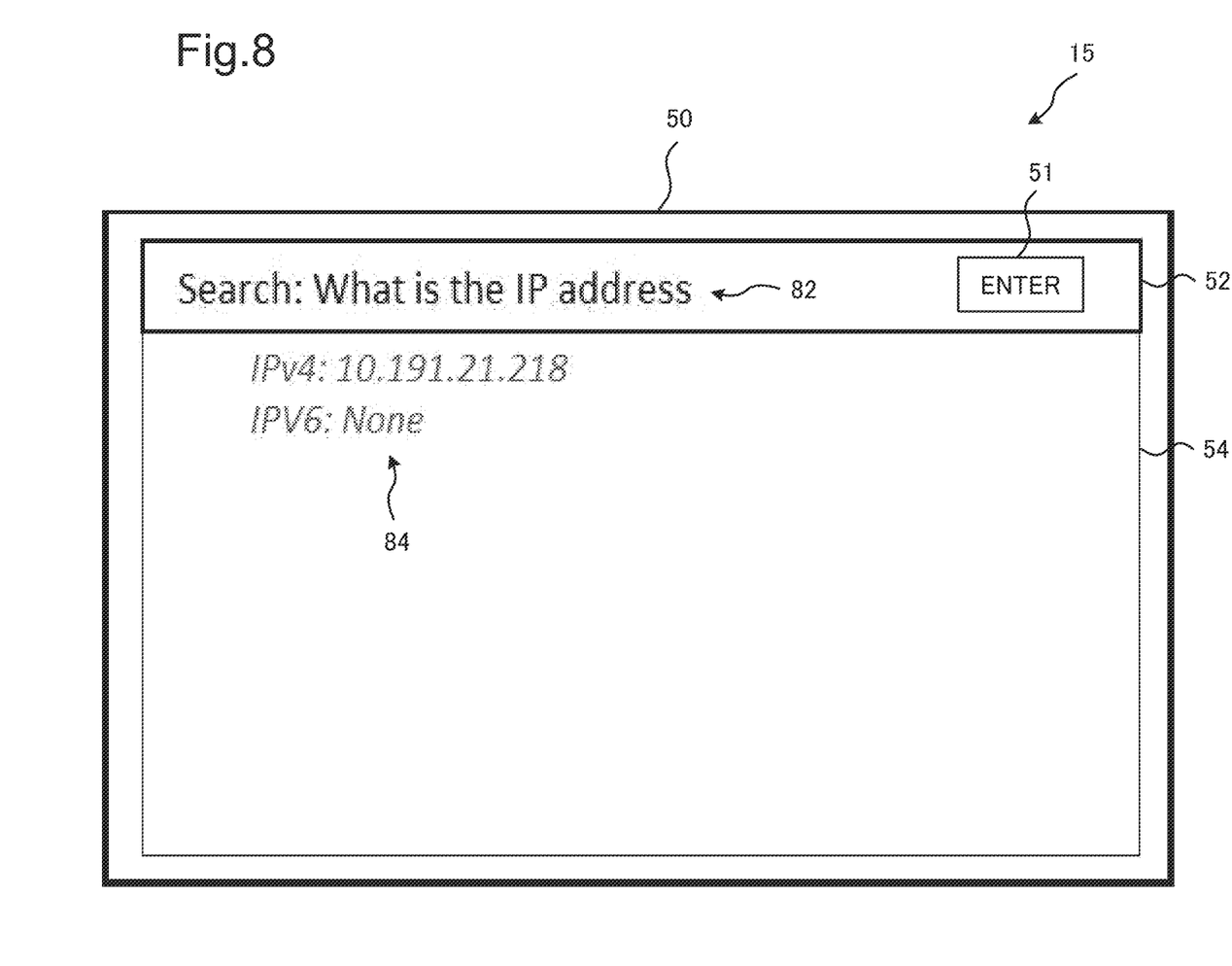
FIG. 8 is a schematic drawing showing the search screen in which a third interrogative has been inputted.

FIG. 3A and FIG. 3B are flowcharts each showing a search operation. FIG. 4 illustrates an example of a home screen. FIG. 5 illustrates an example of a search screen. FIG. 6 illustrates the search screen in which the first interrogative has been inputted. FIG. 7 illustrates the search screen in which the second interrogative has been inputted. FIG. 8 illustrates the search screen in which the third interrogative has been inputted. Hereunder, an operation performed by the image forming apparatus 1 to execute the search operation will be described, with reference to FIGS. 3A and 3B to FIG. 8.

When the power to the image forming apparatus 1 is turned on, the controller 10 causes the display device 15 to display a home screen 40 as shown in FIG. 4. When the user touches, for example, a soft key 42 for selecting the search function, in view of the home screen 40, the touch panel 16A detects that the soft key 42 has been touched, and the controller 10 causes the display device 15 to display a search screen 50 as shown in FIG. 5.

When the search screen 50 is displayed, the controller 10 starts the search operation shown in FIG. 3A and FIG. 3B, and repeatedly decides that an instruction to start the search has not been received (NO at step S10), until the touch panel 16A detects that a soft key 51 for instructing to start the search has been touched.

(1) When Inputted Character String does not Contain Keyword

Referring to FIG. 5, it will be assumed that the user has inputted a character string 53 "IP", through a software keyboard separately displayed on the display device 15. Upon receipt of the input of the character string 53 through the touch panel 16A, the controller 10 causes the display device 15 to display the inputted character string 53 in a first field 52.

When the user touches the soft key 51 in view of the first field 52, the touch panel 16A detects that the soft key 51 has been touched. Then the controller 10 decides that the instruction to start the search has been received (YES at step S10), and decides whether the inputted character string contains the keyword stored in the HDD 18 with respect to each of the setting items (step S11).

In this case, it will be assumed that the character string 53 does not contain the keyword. Accordingly, the controller 10 decides that the inputted character string does not contain the keyword (NO at step S11), and extracts the names containing the inputted character string, out of the plurality of setting items stored in the HDD 18 (step S12). For example, the controller 10 extracts the names "IP address", "IPv4 Settings", "IPv6 Settings", and "swipe to print", as names containing the character string 53 "IP" (at least one of the characters may be a lowercase letter).

After step S12, the controller 10 causes the display device 15 to display the extracted names in a second field 54 as shown in FIG. 5 (step S13), with the link for transiting to the setup screen for the setting item represented by the name, pasted to each of the names. After step S13, the controller 10 finishes the search operation.

For example, when the user touches the name "IPv4 Settings" displayed in the second field 54, and the touch panel 16A detects such a touch operation, the controller 10 causes the display device 15 to display the setup screen for specifying the value of the address of IPv4.

(2) When Inputted Character String Contains Keyword (2-1) When Inputted Character String Contains First Interrogative Referring to FIG. 6, it will be assumed that the user has inputted a character string 62 "How to change IP address", through the software keyboard separately displayed on the display device 15. Upon receipt of the input of the character string 62 through the touch panel 16A, the controller 10 causes the display device 15 to display the inputted character string 62 in the first field 52.

When the user touches the soft key 51 in view of the first field 52, the touch panel 16A detects that the soft key 51 has been touched. Then the controller 10 decides that the instruction to start the search has been received (YES at step S10), and proceeds to step S11. Since the character string 62 contains the keyword "IP address" in this case, the controller 10 decides that the inputted character string contains the keyword (YES at step S11), and decides whether the inputted character string contains the first interrogative (step S14).

In this case, since the character string 62 contains "How", the controller 10 decides that the inputted character string contains the first interrogative (YES at step S14), acquires the procedure information related to the setting item corresponding to the inputted keyword from the HDD 18, and causes the display device 15 to display the procedure information acquired (step S15). To be more detailed, the controller 10 causes the display device 15 to display, as the procedure information related to the setting item "IP address" corresponding to the keyword "IP address", a link 64 for transiting to an operation screen indicating the procedure for specifying or changing the value of the IP address, in the second field 54.

After step S15, the controller 10 finishes the search operation. When the user touches the link 64 to confirm the procedure, and the touch panel 16A detects such a touch operation, the controller 10 causes the display device 15 to display the operation screen.

(2-2) When Inputted Character String Contains Second Interrogative

Referring to FIG. 7, it will be assumed that the user has inputted a character string 72 "Where is the IP address", through the software keyboard separately displayed on the display device 15. Upon receipt of the input of the character string 72 through the touch panel 16A, the controller 10 causes the display device 15 to display the inputted character string 72 in the first field 52.

When the user touches the soft key 51 in view of the first field 52, the touch panel 16A detects that the soft key 51 has been touched. Then the controller 10 decides that the instruction to start the search has been received (YES at step S10), and proceeds to step S11. Since the character string 72 contains the keyword "IP address" in this case, the controller 10 decides that the inputted character string contains the keyword (YES at step S11), and proceeds to step S14.

In this case, since the character string 72 does not contain "How", the controller 10 decides that the inputted character string does not contain the first interrogative (NO at step S14), and decides whether the inputted character string contains the second interrogative (step S16). Since the character string 72 contains "Where" in this case, the controller 10 decides that the inputted character string contains the second interrogative (YES at step S16), acquires the location information related to the setting item corresponding to the inputted keyword from the HDD 18, and causes the display device 15 to display the location information acquired (step S17).

To be more detailed, the controller 10 causes the display device 15 to display, as the location information related to the setting item "IP address" corresponding to the keyword "IP address", a link 74 for transiting to the setup screen for specifying the value of the IP address of IPv4 and IPv6, in the second field 54. After step S17, the controller 10 finishes the search operation. When the user touches the link 74 to specify the value of the IP address, and the touch panel 16A detects such a touch operation, the controller 10 causes the display device 15 to display the setup screen.

(2-3) When Inputted Character String Contains Third Interrogative

Referring to FIG. 8, it will be assumed that the user has inputted a character string 82 "What is the IP address", through the software keyboard separately displayed on the display device 15. Upon receipt of the input of the character string 82 through the touch panel 16A, the controller 10 causes the display device 15 to display the inputted character string 82 in the first field 52.

When the user touches the soft key 51 in view of the first field 52, the touch panel 16A detects that the soft key 51 has been touched. Then the controller 10 decides that the instruction to start the search has been received (YES at step S10), and proceeds to step S11. Since the character string 82 contains the keyword "IP address" in this case, the controller 10 decides that the inputted character string contains the keyword (YES at step S11), and proceeds to step S14.

In this case, since the character string 82 contains neither of "How" and "Where", the controller 10 decides that the inputted character string contains neither the first interrogative (NO at step S14) nor the second interrogative (NO at step S16), and decides whether the inputted character string contains the third interrogative (step S18).

Since the character string 82 contains "What" in this case, the controller 10 decides that the inputted character string contains the third interrogative (YES at step S18), acquires the current set value related to the setting item corresponding to the inputted keyword from the HDD 18, and causes the display device 15 to display the current set value acquired (step S19).

To be more detailed, the controller 10 causes the display device 15 to display, as the current set value related to the setting item "IP address" corresponding to the keyword "IP address", a value 84 of the IP address currently specified for the image forming apparatus 1, in the second field 54. After step S19, the controller 10 finishes the search operation.

In the case where the inputted character string contains none of "How", "Where", and "What", the controller 10 decides that the inputted character string contains none of the first interrogative, the second interrogative, and the third interrogative (NO at step S14, step S16, and step S18), and causes the display device 15 to display error information indicating that the information to be displayed is unidentifiable (step S20). After step S20, the controller 10 finishes the search operation.

Now, in order to acquire the current set value, or the procedure information for changing or specifying the set value, with respect to the setting item, the user has to perform different operations depending on the type of the information to be acquired, which is both troublesome and time-consuming. In particular, when the user is not sufficiently familiar with the operation of the electronic apparatus, the trouble and the time are further increased. The aforementioned known technique is merely designed to change the display of the setup screen according to the inputted keyword, and therefore does not provide a solution to the mentioned drawbacks.

According to the foregoing embodiment, in contrast, the controller 10 causes the display device 15 to display the link 64 for transiting to the operation screen indicating the procedure for specifying or changing the value of the IP address, when the inputted character string 62 contains the keyword "IP address", and also the first interrogative for questioning the method. When the inputted character string 72 contains the keyword "IP address", and also the second interrogative for questioning the location, the controller 10 causes the display device 15 to display the link 74 for transiting to the setup screen for specifying the value of the IP address. When the inputted character string 82 contains the keyword "IP address", and also the third interrogative for questioning what the subject is, the controller 10 causes the display device 15 to display the value 84 of the IP address currently specified for the image forming apparatus 1.

The mentioned arrangement assures the user to acquire the desired information related to the setting item, through a simple and intuitive operation of inputting the keyword corresponding to the setting item and the interrogative. Therefore, the trouble and the time required for the acquisition of the desired information related to the setting item can be significantly reduced, compared with the case of performing different operations depending on the type of the information to be acquired.

According to the foregoing embodiment, in addition, the controller 10 determines in advance the first interrogative as "how", the second interrogative as "where", and the third interrogative as "what". Such an arrangement further facilitates the user to perform a simple and intuitive operation, to acquire the desired information.

Further, the controller 10 acquires the content to be displayed by the display device 15, from the HDD 18, according to the foregoing embodiment. Such an arrangement further assures the user to acquire the desired information.

Other Variations

In the foregoing embodiment, the controller 10 acquires the information corresponding to the inputted interrogative about the setting item "IP address", and causes the display device 15 to display such information, when the inputted character string contains the keyword "IP address" and the interrogative. However, the disclosure is not limited to such embodiment. For example, the HDD 18 may contain a keyword "density", with respect to the setting item "print density" regarding the image forming operation, and the controller 10 may acquire the information corresponding to the inputted interrogative related to the setting item "print density", when the inputted character string contains the keyword "density" and also the interrogative.

The mentioned arrangement assures the user to acquire the desired information about the setting item related to the image forming operation, through a simple and intuitive operation of inputting the keyword corresponding to the setting item related to the image forming operation, and the interrogative.

Although the user inputs, through the operation device 16, the character string 62 "How to change IP address", the character string 72 "Where is the IP address", or the character string 82 "What is the IP address" in the foregoing embodiment, the disclosure is not limited to such embodiment. For example, the user may input a character string containing only the keyword and the interrogative. More specifically, the user may input a character string "How, IP address" instead of the character string 62, a character string "Where, IP address" instead of the character string 72, or a character string "What, IP address" instead of the character string 82.

Further, although the image forming device 12 is configured to form an image on the recording sheet P in the foregoing embodiment, the disclosure is not limited to such an embodiment. The image forming device 12 may form an image on a different type of recording medium, such as an overhead projector (OHP) sheet, without limitation to the recording sheet.

The disclosure may be modified in various manners, without limitation to the configuration according to the foregoing embodiment. For example, although the image forming apparatus is exemplified by a color multifunction peripheral in the embodiment, a different type of image forming apparatus, such as a monochrome multifunction peripheral, a copier, or a facsimile machine, may be employed. Likewise, the electronic apparatus is not limited to the image forming apparatus 1. The electronic apparatus may be, for example, a PC or a smartphone.

The configurations and processings according to the foregoing embodiments, described with reference to FIG. 1 to FIG. 8, are merely exemplary and in no way intended to limit the disclosure to those configurations and processings.

While the present disclosure has been described in detail with reference to the embodiments thereof, it would be apparent to those skilled in the art the various changes and modifications may be made therein within the scope defined by the appended claims.

What is claimed is:

1. An electronic apparatus comprising: a display device;
an operation device that receives a character string inputted by a user; and
a control device including a processor, and configured to act as a controller that executes a predetermined process according to a set value of a predetermined setting item, when the processor executes a control program,
wherein the controller causes the display device, when the character string inputted via the operation device contains a predetermined keyword corresponding to the setting item, and a predetermined first interrogative for questioning a method, to display procedure information indicating a procedure for changing or specifying the set value of the setting item corresponding to the keyword,
causes the display device, when the character string contains the keyword and a predetermined second interrogative for questioning a location, to display location information indicating a location of a setup screen for specifying the set value of the setting item corresponding to the keyword, and
causes the display device, when the character string contains the keyword and a predetermined third interrogative for questioning what a subject is, to display a current set value of the setting item corresponding to the keyword,
wherein the controller sets in advance an interrogative "How" as the first interrogative, an interrogative "Where" as the second interrogative, and an interrogative "What" as the third interrogative.

2. The electronic apparatus according to claim 1, further comprising a storage device in which the keyword, the procedure information, the location information, and the current set value are stored in association with each other, with respect to each of a plurality of setting items,
wherein the controller acquires a content to be displayed by the display device, from the storage device.

3. The electronic apparatus according to claim 1, further comprising a storage device in which respective names of a plurality of setting items are stored in advance,
wherein, when the character string does not contain the keyword, the controller extracts a name containing the character string out of the names of the plurality of setting items, and causes the display device to display the location information indicating the location of the setup screen related to the setting item represented by the extracted name.

4. An image forming apparatus comprising:
the electronic apparatus according to claim 1; and
an image forming device that forms an image on a recording medium,
wherein the controller causes the image forming device to form an image according to the set value of the setting item related to image forming, as the predetermined process.

* * * * *